United States Patent
Cowan et al.

[19]

[11] Patent Number: 5,878,902
[45] Date of Patent: Mar. 9, 1999

[54] SLOPED BOTTOM TANK

[75] Inventors: Jerry W. Cowan; Jeffrey K. Felton, both of Rogersville, Mo.

[73] Assignee: Custom Metalcraft, Inc., Springfield, Mo.

[21] Appl. No.: 760,235

[22] Filed: Dec. 4, 1996

Related U.S. Application Data

[62] Division of Ser. No. 490,177, Jun. 14, 1995, Pat. No. 5,701,776.

[51] Int. Cl.⁶ .................................................. B65D 87/00
[52] U.S. Cl. ............................ 22/1.5; 220/571; 220/601; 220/608; 220/623
[58] Field of Search ........................... 220/571, 1.5, 601, 220/608, 623

[56] References Cited

U.S. PATENT DOCUMENTS

| | | |
|---|---|---|
| 1,235,438 | 7/1917 | Chynoweth . |
| 1,430,000 | 9/1922 | Bell . |
| 2,180,185 | 11/1939 | Weiss . |
| 2,339,303 | 1/1944 | Tillery . |
| 2,843,205 | 7/1958 | Greulich ..................................... 83/452 |
| 3,096,900 | 7/1963 | Breneman . |
| 3,186,607 | 6/1965 | Lubenow . |
| 4,082,026 | 4/1978 | Miyazaki ................................... 83/465 |
| 4,284,267 | 8/1981 | Marben ...................................... 269/266 |
| 4,557,406 | 12/1985 | Olinger et al. . |
| 4,648,521 | 3/1987 | Thomas et al. . |
| 4,785,958 | 11/1988 | Snyder . |
| 4,840,284 | 6/1989 | Snyder . |
| 5,287,717 | 2/1994 | Lancaster ................................... 72/332 |
| 5,474,205 | 12/1995 | Lancaster ................................. 220/571 |
| 5,566,848 | 10/1996 | Rude et al. ........................... 220/1.5 X |

FOREIGN PATENT DOCUMENTS

| 655679 | 5/1986 | Switzerland ............................ 269/266 |
|---|---|---|

*Primary Examiner*—Steven M. Pollard
*Attorney, Agent, or Firm*—Bergert & Bergert

[57] ABSTRACT

An improved tank configuration includes a die employed to stamp a formed member. The formed member may be used as the bottom head for a portable liquid container, and is constructed so that all welding is eliminated in the corner portions of the container. A trim machine is employed to remove uneven edges from the formed part. The invention is particularly useful in constructing sloped bottom tanks of increased depth. By the present invention, a stamped configuration is provided in which a draw formed tank bottom is formed so as to allow complete and full drainage of the tank bottom. The bottom head is finish trimmed to exact dimensions so as to facilitate assembly to the shell of the tank.

6 Claims, 7 Drawing Sheets

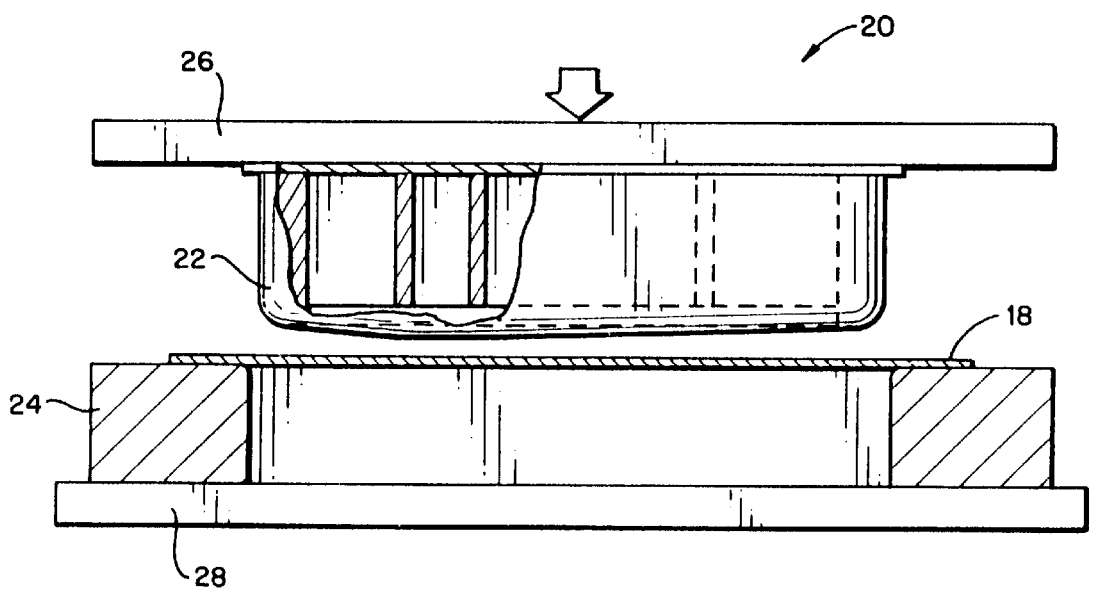
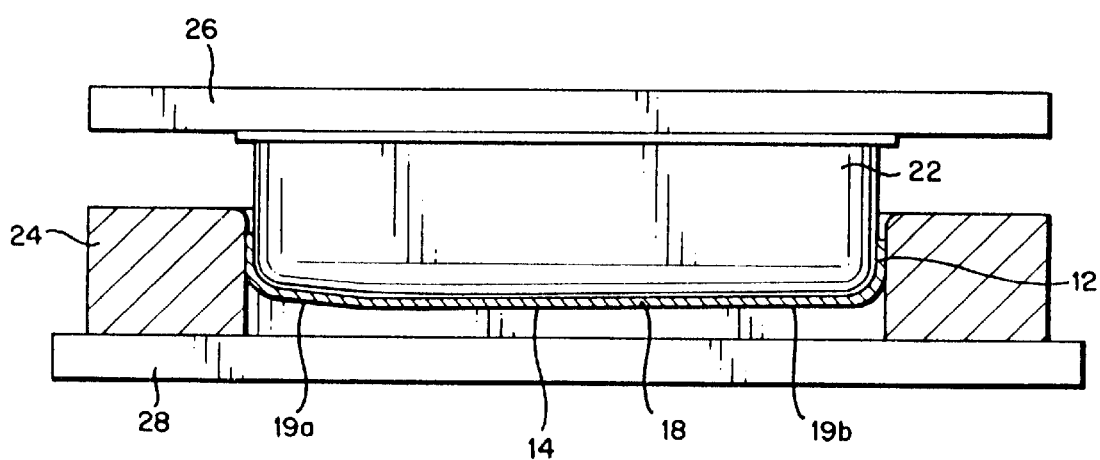

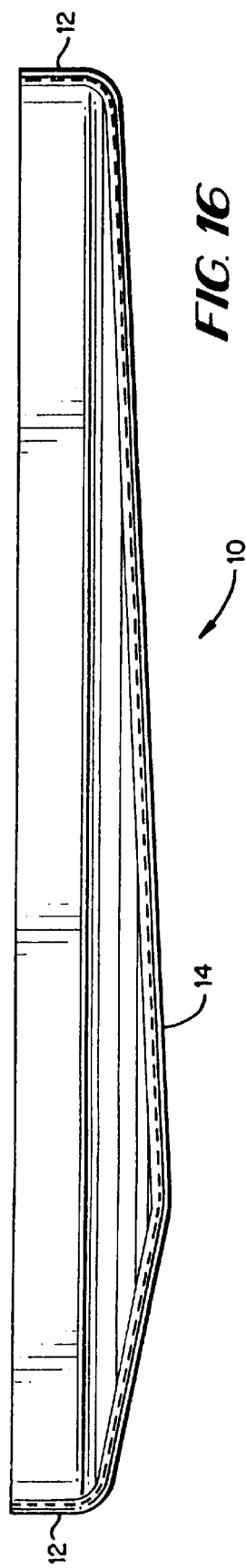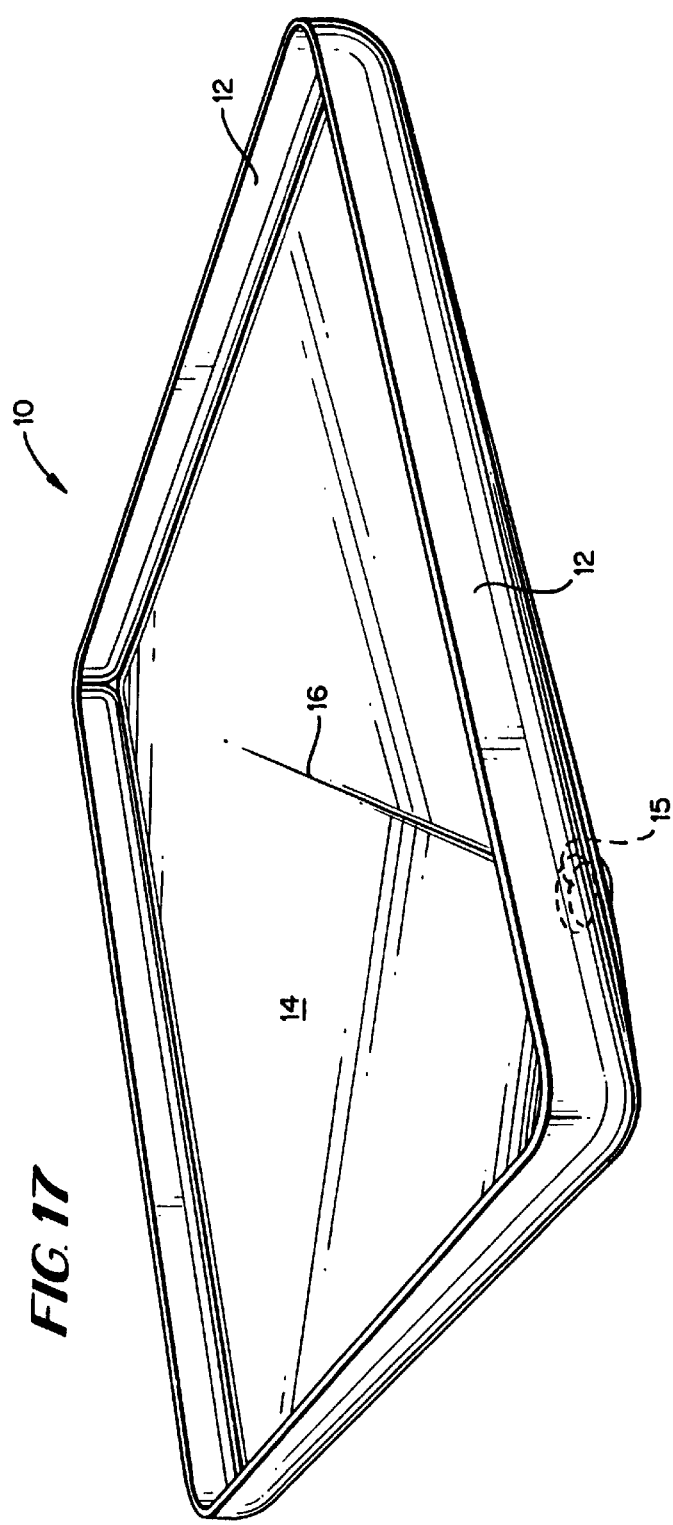

SLOPED BOTTOM TANK

This is a division of application Ser. No. 08/490,177 filed Jun. 14, 1995, now U.S. Pat. No. 5,701,776.

BACKGROUND AND SUMMARY OF THE INVENTION

The present invention relates to a portable tank having an improved bottom configuration. More particularly, the present invention relates to a stamped-sloped configuration for the bottom of a portable tank having improved features with regard to manufacture and use of the tank. The invention is particularly useful in constructing sloped bottom tanks of increased depth.

Previous portable tank configurations are described, for example, in the following U.S. Pat. Nos.: 1,235,438 to Chynoweth; 1,430,000 to Bell; 2,180,185 to Weiss; 2,339,303 to Tillery; 3,096,900 to Breneman; 3,186,607 to Lubenow; 4,557,406 to Olinger et al; 4,648,521 to Thomas et al; 4,785,958 to Snyder; 4,840,284 to Snyder; and 5,287,717 to Lancaster.

By the present invention, there is provided an improved tank configuration with regard to the bottom portion thereof, wherein a die is employed to stamp a formed member employed as the bottom head for a portable container, and which is constructed so that all welding is eliminated in the corner portions of the container. A trim machine is employed to remove uneven edges from the formed part.

Accordingly, it is an object of the present invention to provide a stamped configuration in which a draw formed tank bottom is formed so as to allow complete and full drainage of the tank bottom.

It is another object of the invention to provide an improved tank bottom configuration in which all welded corner inserts are eliminated.

It is a further object of the invention to allow the bottom head of a portable container to be finish trimmed to exact dimensions, particularly when drawing a deeper head, so as to facilitate the assembly of these parts to the shell of the tank.

BRIEF DESCRIPTION OF THE DRAWINGS

FIG. 1 is a side elevation in partial cross-section showing the unformed bottom head of a container as a flat sheet positioned in the head forming die which is in the open position.

FIG. 2 is a side elevation similar to FIG. 1, showing the head which has now been formed, with the head forming die in the closed position.

FIG. 16 is a front view of the formed and trimmed head.

FIG. 17 is a perspective view of the-formed and trimmed head with drain opening and crease.

DESCRIPTION OF THE PREFERRED EMBODIMENTS

Figure 6:
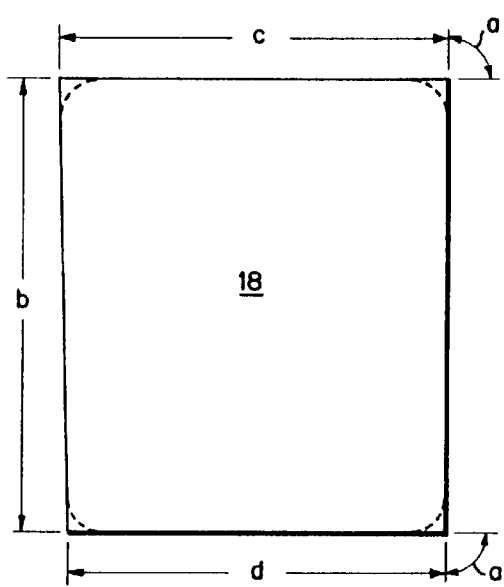
FIG. 6 is a plan view showing a dimensional arrangement of an unformed head of the present invention.
Figure 7:
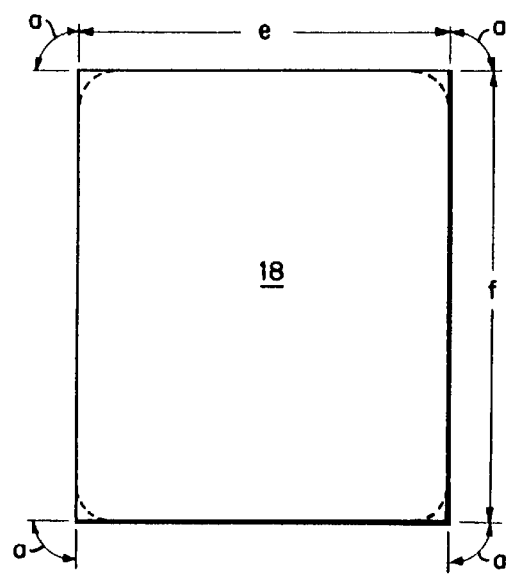
FIG. 7 is a plan view showing a dimensional arrangement of another unformed head of the present invention.

In the embodiment of the invention as shown in FIGS. 1 through 17, there is provided a tank bottom 10 having side wall portions 12 and a bottom portion 14. The tank bottom 10 is formed initially from a flat, generally rectangular sheet 18 of metal or similar material as shown in FIGS. 1 and 2, with the sheet 18 being positioned in a head forming die 20 having punch 22 and die 24 members. In preparing the flat sheet 18 for the form die 20, the corners of the sheet 18 are trimmed off in a curved line as shown in dotted lines in FIGS. 6 and 7. Such initial trimming of the sheet 18 assists in producing smooth corner surfaces for the formed piece. The dimensions of the sheet to be formed depend on the slope or desired depth for the tank bottom. If the tank bottom is to be provided with a ½ inch depth, for example, the rectangular sheet of FIG. 7 may be used. If the tank bottom is to have a greater depth, such as one inch, for example, the tapered sheet of FIG. 6 may be used. In one embodiment of such a tank of 1 inch depth, dimension "b" was 52½ inches, while "c" was 47 inches and "d" was 46¾ inches.

Figure 8:
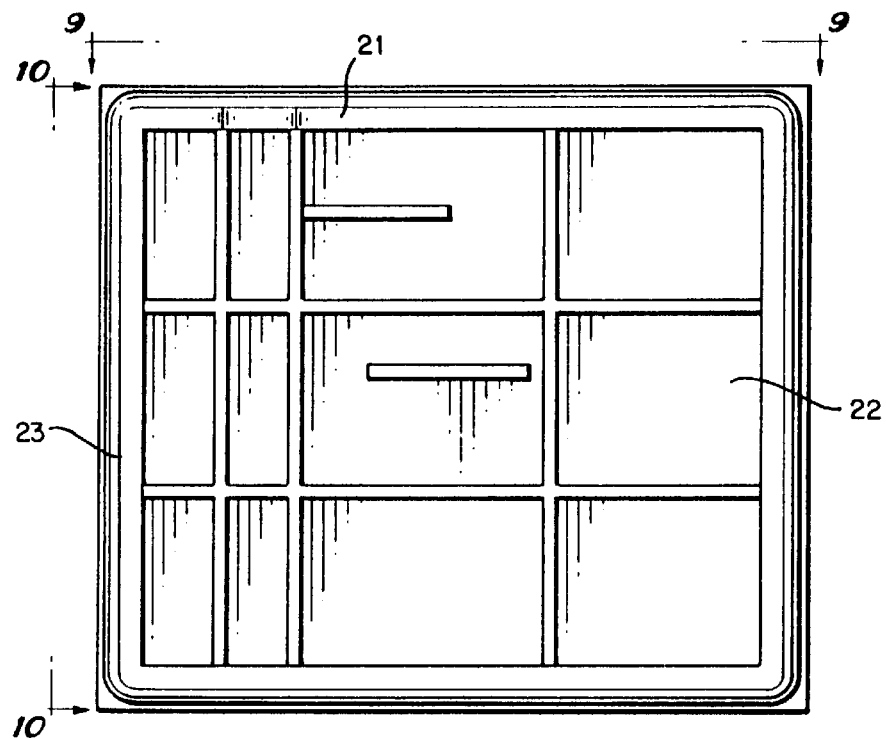
FIG. 8 is a bottom plan view of the punch member of the head forming die.
Figure 9:
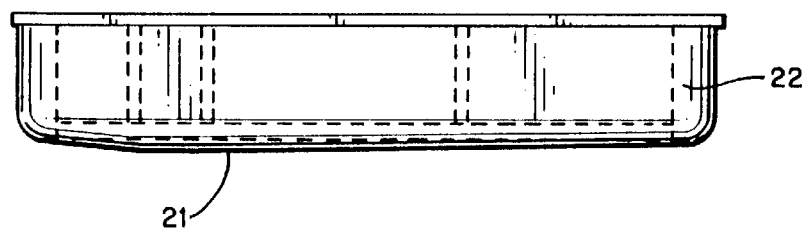
FIG. 9 is a front view of the punch member of the head forming die taken along line 9—9 of FIG. 8.
Figure 10:
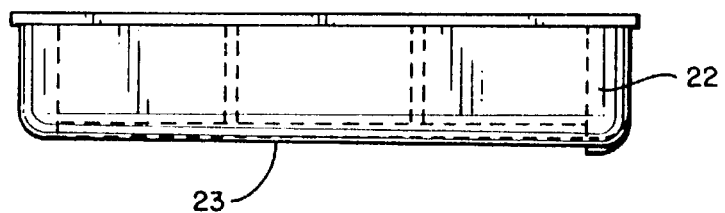
FIG. 10 is a side view of the punch member of the head forming die taken along line 10—10 of FIG. 8.

A top die shoe 26 and bottom die shoe 28 extend across the upper and lower portions of the head forming die 20. The punch member 22 is provided with a pair of adjacent sloped edges 21, 23 as shown in FIGS. 8 through 10 which provide the sheet 18 with a sloped bottom portion 14 when formed. The sloped edges 21, 23 are of sufficient size to form the tank bottom with the desired depth.

Upon being formed as shown in FIG. 2, a cross section of the formed sheet 18 shows the two downwardly sloping surfaces 19a and 19b which intersect in the region in which a drain opening is subsequently formed in the tank bottom. An upward crease is also subsequently formed in the sheet material 18 to stiffen the bottom and to assist with drainage. The crease 16 extends generally in the direction of a line passing through the drain opening 15 and the central region of the bottom portion 14, as shown in FIG. 17. The specific location of the drain opening, which determines the dimensions 19a and 19b, may be varied depending on the intended use of the specific container. In general, however, the bottom surface 14 will be smoothly contoured upwardly toward the side walls 12 from the region of the drain opening. In one embodiment of the invention, the side walls 12 are approximately 2½ to 3½ inches in height and the drain opening is approximately 1 inch lower than the side walls 12.

Figure 3:
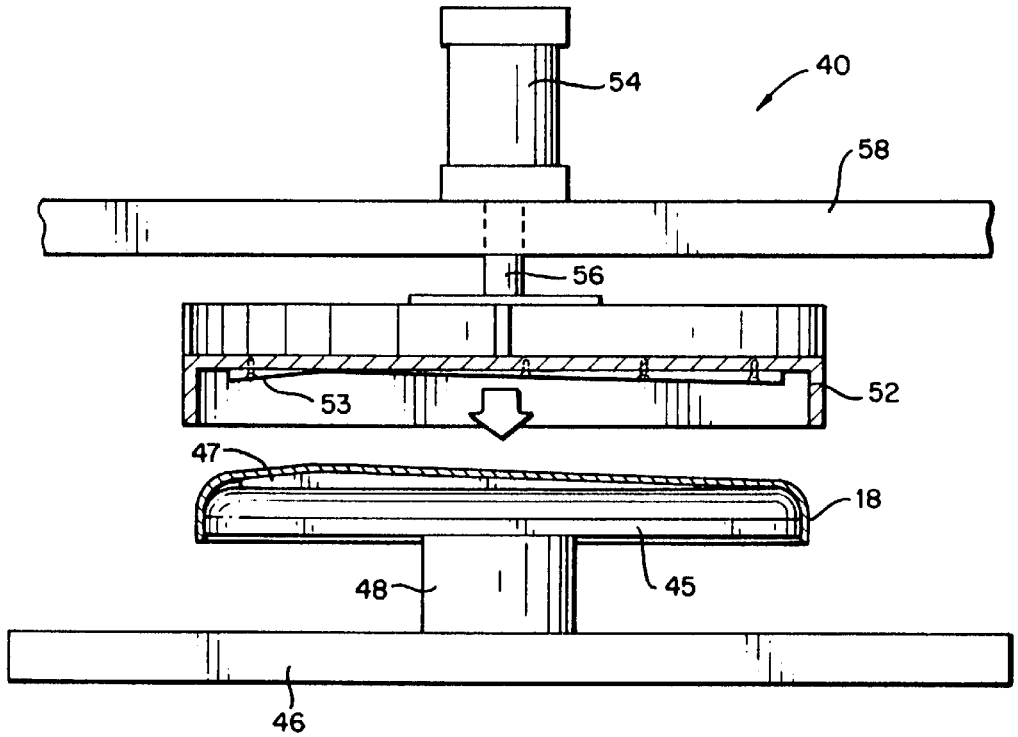
FIG. 3 is a side elevation of a trim machine for use in trimming the edges of the formed head, showing the trim machine in the unclamped position.
Figure 4:
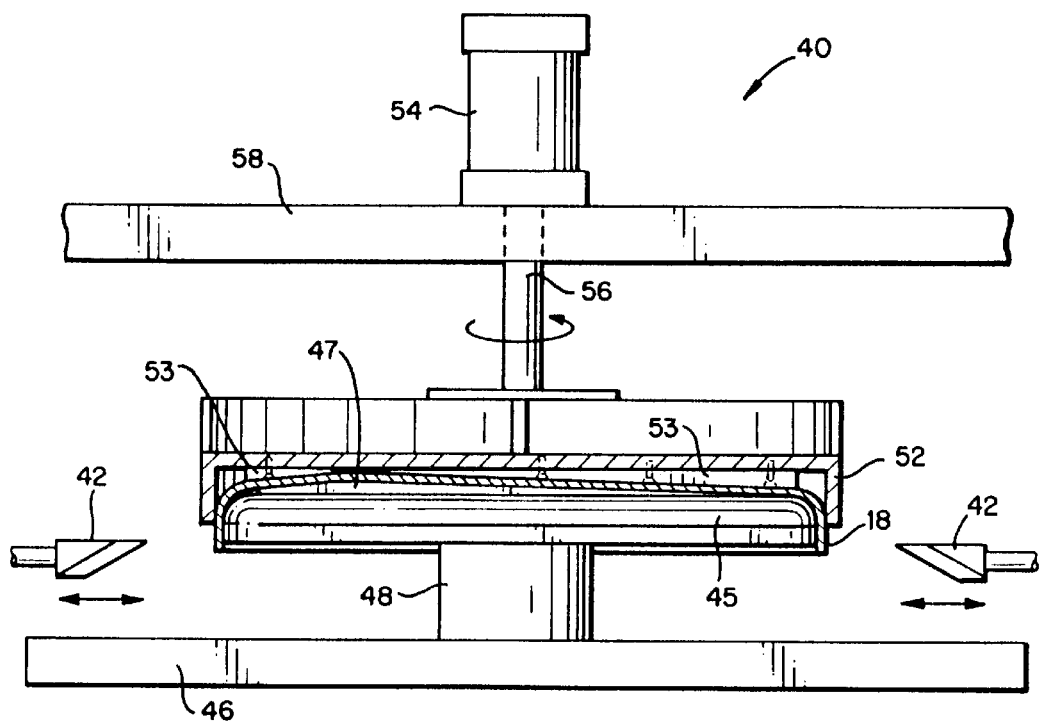
FIG. 4 is a side elevation of the trim machine of FIG. 3, showing the trim machine in the clamped position.
Figure 5:
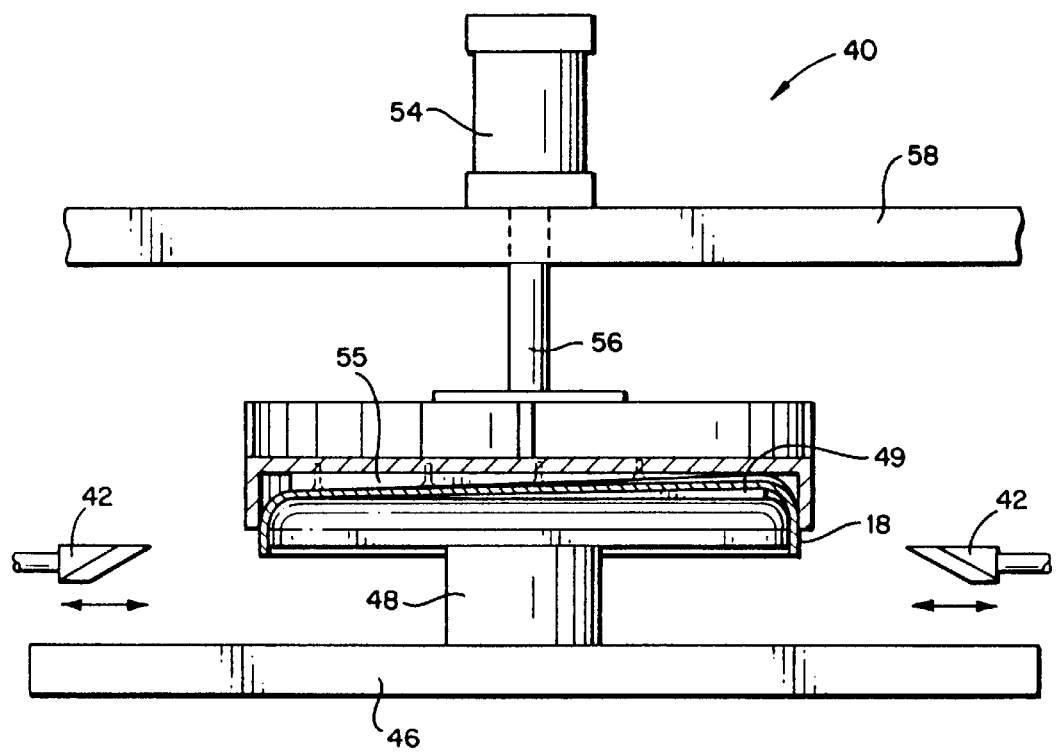
FIG. 5 is a side elevation of the trim machine of FIG. 3 in the clamped position with the head rotated 90 degrees from its position in FIG. 4.

After being formed in the die 20, the material 18 is next transferred manually or by other means to the trim machine 40 of FIGS. 3 through 5. The trim machine 40 operates to remove uneven edges from the formed upper side walls 12 of the sheet 18 to facilitate the merging and assembly of these side wall portions 12 with the main side walls of the tank or container. The trim machine 40 includes a pair of reciprocating shear blades 42 operated by piston and cylinder members mounted on a platform 46. The formed sheet 18 is mounted on a trimmer head die 45, which is supported by a pedestal 48 having the capability by the use of conventional equipment to rotate the formed sheet 18 by 90 degrees in either direction about its vertical axis.

A clamp frame 52 is mounted on a part clamp cylinder 54 and piston 56 arrangement for use in holding the formed sheet 18 during the trim operation as shown in FIGS. 3 through 5. The cylinder 54 is fixed to a frame member 58 of the trim machine 40. The clamp frame 52 is free to rotate in conjunction with the piston 56 and thus the frame 52 will rotate with the formed sheet 18 on the pedestal 48. In one embodiment of the invention, the clamp frame 52 is provided with inserts 53, 55 shaped to match the outer contour of the sloped formed sheet 18. These inserts 53, 55 may be bolted to the clamp frame 52.

Figure 11:
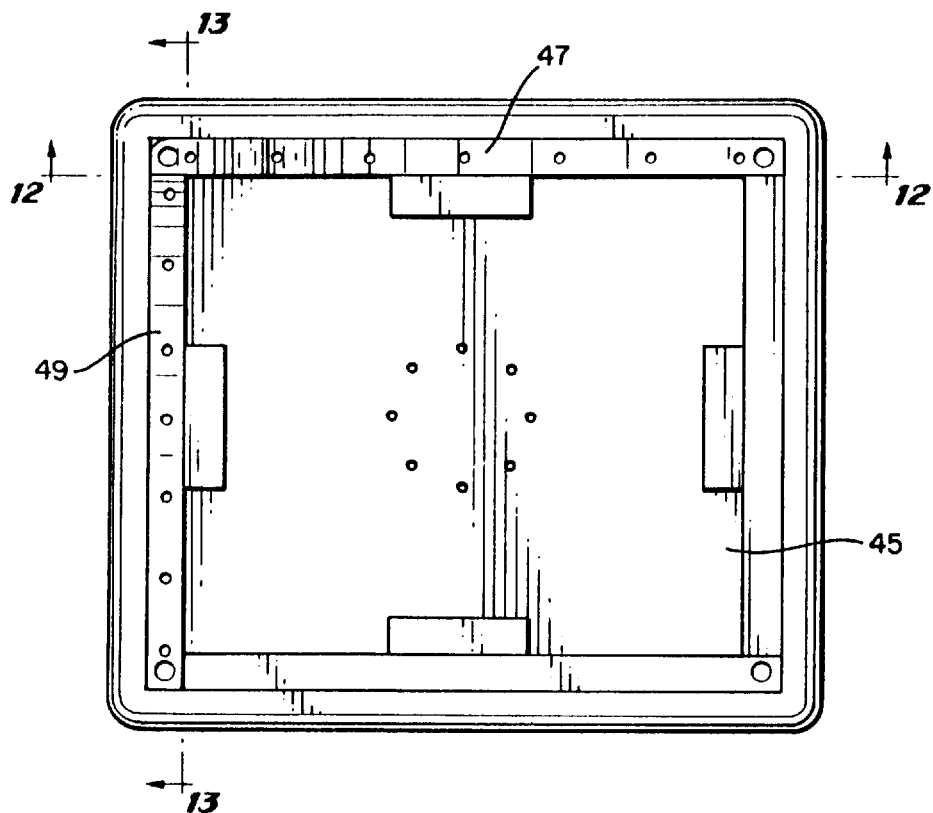
FIG. 11 is a top plan view of the trimmer head die of the present invention.
Figure 12:
FIG. 12 is a front cross-sectional view of the trimmer head die of FIG. 11 taken along line 12—12 of FIG. 11.
Figure 13:
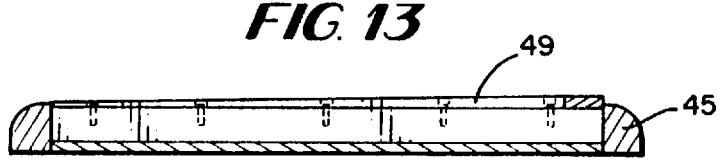
FIG. 13 is a side cross-sectional view of the trimmer head die of FIG. 11 taken along line 13—13 of FIG. 11.

Since the clamp frame is capable of providing 500 pounds of pressure to the sheet, adequate support for the formed sheet 18 is necessary in order to maintain the slope of the sheet as well as to allow the edges of the sheet to be trimmed evenly. Such support is provided as shown in FIGS. 11 through 13, where the trimmer head, die fixture 45 is provided with a pair of sloped bars 47, 49 positioned along adjacent edges to match the inner contour of the formed sheet 18. By matching the inner and outer contours of the formed sheet 18, the trimmer head die fixture 45 and the clamp frame 52 cooperate to maintain the slope of the sheet 18 and assure an even cut by the trim machine 40 on the upper side walls 12 of the formed sheet 18 as shown in FIGS. 3 through 5. The sloped bars 47, 49 may be secured to the die fixture 45 by counter sunk bolts 44 or the like.

Figure 14:
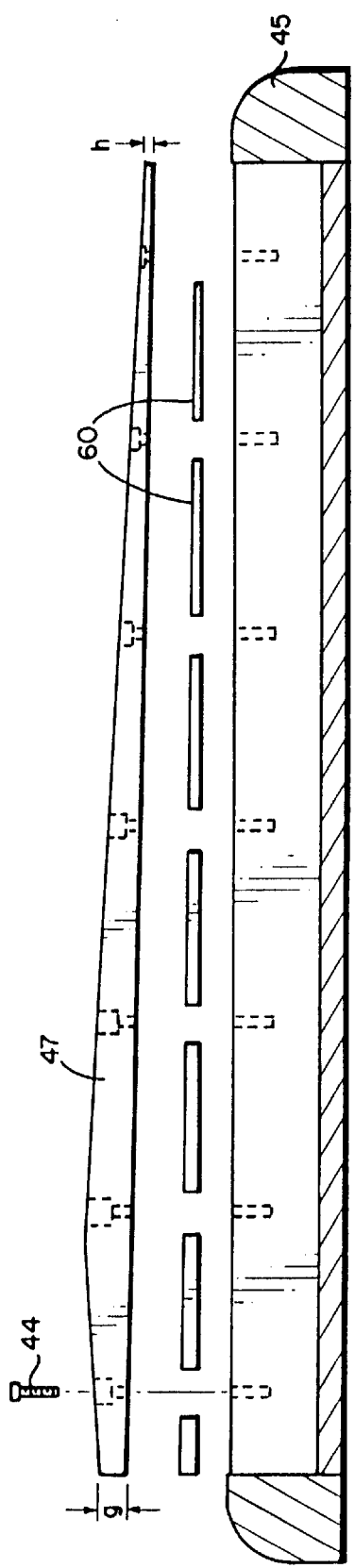
FIG. 14 is a front exploded view of a cross-section similar to FIG. 12 showing the spacer bar and shim arrangement.
Figure 15:
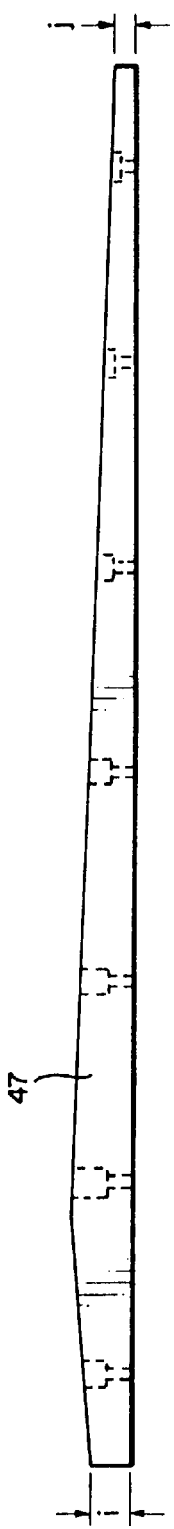
FIG. 15 is a front view of the spacer bar attachment to be used without shims.

When deeper drawn heads are being trimmed, the standard sloped bars 47, 49 may be raised by shims 60 provided between the die fixture 45 and the sloped bars 47, 49 as shown in FIG. 14. The raised sloped bars 47, 49 thereby provide the necessary support to prevent the clamp frame 52 from pressing the formed sheet 18 too far down during the trimming operation. The shims 60 are initially positioned along the appropriate edge of the die fixture 45 as a one-piece shim bar which is tapered according to the desired slope. Once in position, the shim bar can be shimmed to form separate members 60 as shown in FIG. 14. If support is desired for a deeper formed head without the use of shims 60, the sloped spacer bars 47, 49 may be provided with larger dimensions, as shown in FIG. 15 for spacer bar 47.

After the trimming operation, a drain opening 15 and a crease 16 are formed in the bottom portion 14, as shown in FIG. 17.

By constructing the present invention with a one piece bottom configuration in a die and with final trimming of the bottom prior to assembly to the shell of the tank, it is seen that there is no need for welding in the corner portions and no need for a notch for slope drainage.

When the formed piece is to be employed as a tank bottom, as shown in FIG. 16, supporting legs may be mounted on the underside of the formed tank bottom at the four corners thereof in a conventional manner.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A tank member for liquids, said tank having generally upwardly extending sides and a sloped bottom member formed from a trapezoidal-shaped plate member for complete drainage of liquid from the tank, and with said sloped bottom member having a greater depth as compared to a sloped bottom member having a like horizontal cross-section formed of a rectangular plate member, said greater depth resulting from the employment of the trapezoidal-shaped plate member, said sloped bottom member comprising a one-piece construction having no welded joints, formed by tapering a generally flat, rectangular plate member into a trapezoidal shape with one side of the plate member being longer than the opposite side thereof and deforming said plate member such that said sloped bottom member has a bottom wall portion and upwardly extending side wall portions, said bottom wall portion having at least one downwardly sloping surface, said side wall portions extending continuously around the periphery of said bottom wall portion and having trimmed edges.

2. The tank member of claim 1 wherein the formation of said sloped bottom member includes the use of a trim machine having cutting means and plate support means, with said plate support means having a pair of spacer bars mounted on respective adjacent edges of said plate support means so as to form intersecting raised edge portions, and wherein said formed plate member is positioned on said plate support means so that the side of said formed plate member which corresponds to said side which is longer than the opposite side thereof is positioned over one of said intersecting raised edge portions, with the cutting means of the trim machine then being operated to trim the side wall portions of said formed plate member.

3. The tank member of claim 1 wherein said bottom wall portion of said sloped bottom member is provided with a drain opening.

4. The tank member of claim 3 wherein said bottom wall portion is smoothly contoured so as to slope generally upwardly from said drain opening toward each side wall portion.

5. The tank member of claim 1 wherein said bottom wall portion of said sloped bottom member is provided with an upward crease.

6. The tank member of claim 5 wherein said bottom wall portion of said sloped bottom member is provided with a drain opening and said crease extends generally in the direction of a line passing through the drain opening and the central region of the bottom wall portion of said sloped bottom member.

* * * * *